T. C. Clarke,
Faucet,
Nº 4419. Patented Mar. 14, 1846.
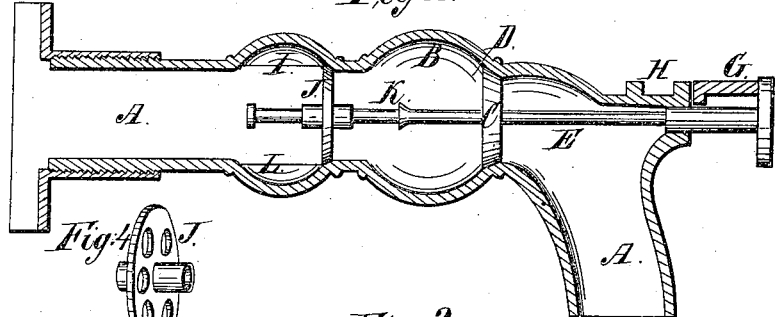
Fig. 1.
Fig. 4.
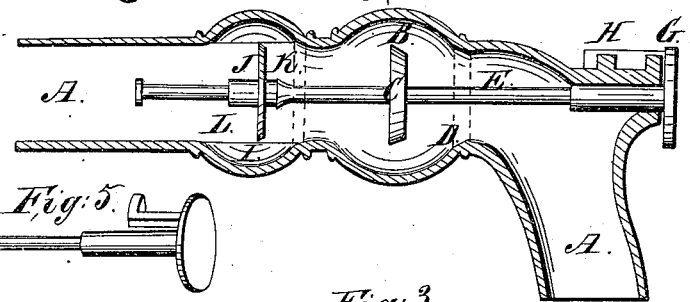
Fig. 2.
Fig. 5.
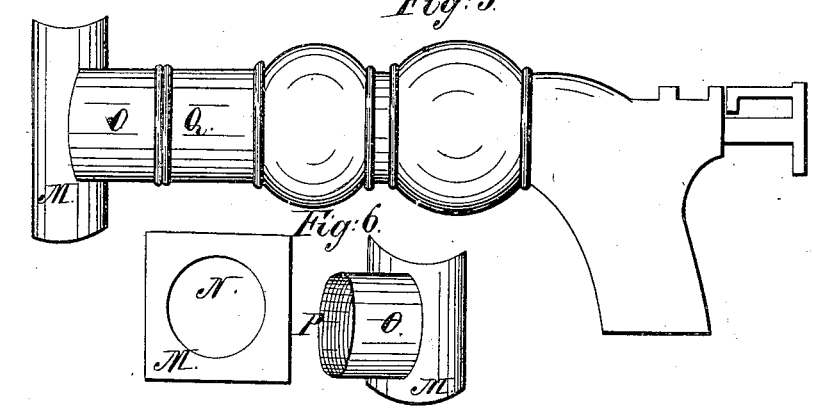
Fig. 3.
Fig. 6.

UNITED STATES PATENT OFFICE.

THOMAS C. CLARKE, OF PHILADELPHIA, PENNSYLVANIA.

STOP-COCK.

Specification of Letters Patent No. 4,419, dated March 14, 1846.

*To all whom it may concern:*

Be it known that I, THOMAS C. CLARKE, of Philadelphia, in the county of Philadelphia and State of Pennsylvania, have invented a new and useful Improvement on Cocks or Faucets Heretofore and Now Used for Drawing Water and other Liquids; and I do hereby declare that the following is a full, clear, and exact description of the construction and operation of the same, reference being had to the annexed drawings, making a part of this specification, in which—

Figure 1, is a sectional (interior) view of the cock or faucet with the valves closed. Fig. 2 is a sectional (interior) view of the cock or faucet with the valves open. Fig. 3 is an exterior view of the cock or faucet. Fig. 4 is a perspective view of the second or sliding valve. Fig. 5 is a view of the catch handle designed to hold the valves back when open. Fig. 6 is a view of the screw attachment which after being secured to the pipe or vessel, is intended to receive and secure the cock or faucet.

My invention consists in inserting a valve C, within the tube A of the faucet or cock, a bulb or chamber B being formed where the valve is to work, by enlarging the tube A at that point, sufficiently to admit the free passage of the liquid around and by the valve; the seat D of this valve is formed upon and around the inner surface of the tube as near the nozzle as it can conveniently be placed, and at the front termination of the valve chamber. This valve is pushed back, against the liquid, by means of a rod or spindle, which passes out in a direct line, from the center of the valve, through the front of the cock or faucet which at that aperture is extended so as to serve as a guide to keep the rod and valve true to the center. By means of this rod or spindle the valve is pushed back, from its seat, against the current of the liquid, and into its chamber, thus admitting the passage of the liquid. The valve is kept open by means of a catch G on the exterior end of the valve spindle or rod, which catch turns, when desired, against knobs H secured on the extreme nozzle end of the cock or faucet. Additional knobs may be employed to graduate the flow of the liquid. When released from outward pressure, the valve is forced to its seat and kept closed by the liquid within, though the catch G may, for additional security, be turned against the first or end knob.

To prevent damage to the pipe, from a too sudden stoppage of the water, or other liquid, I form a second chamber or bulb I behind or beyond the first chamber B and continue the rod or spindle of the first valve C into the second chamber I. On this rod or spindle I place a sliding valve J which moves to and fro, on this spindle or rod within its chamber. This sliding valve is perforated with holes, or otherwise made open, so as to stop off but a portion of the liquid, leaving the remainder of the current to be stopped off by the front or true valve; this sliding valve is pushed back by a permanent knob K on the valve rod or spindle which knob K is placed so far from the front, or true valve, that the latter valve is half way opened before the sliding valve is reached and pushed back by the knob K. The distance of the sliding valve from its seat, when open, is therefore but half the distance which the front valve is from its seat when open, so that, having but half the distance to travel, the sliding valve reaches its seat in half the time occupied by the closing of the front valve and thereby shuts off half the stream before the other reaches its seat, so that each valve shuts off, in succession, a portion of the stream. When the sliding valve has closed up, the rod or spindle, on which it slides, passes on to enable the front valve to reach its seat. To prevent any vibration of the valves, from the force of the current, strips or projections L are left longitudinally across the second valve chamber I running even with the interior surface of the tube, against which the valve, sliding, is kept to its center.

In making the cock or faucet the valve seat is cut by a tool, formed for the purpose and entering from the open end of the tube. The valve and rod or spindle, after being turned, with true centers, and the sliding valve placed in its place on the rod, are together put in at the large end of the parallel tube, when the rod or spindle end passing out front, is secured to the catch handle.

In securing the cock or faucet to the pipe or vessel from whence liquid is to be drawn, I form a plate M of a shape to fit the place to which it is to be attached, and in or near the center of the plate is an opening N around and from which projects a short tube Q on the inner surface of which is cut a female thread P into which a thread or the end of the cock Q or faucet fits. The plate being permanently soldered or otherwise fastened to the pipe or vessel from whence liquid is to be drawn, admits of the cock or faucet being screwed on or off at pleasure.

What I claim, as my invention and improvement is—

The introduction of a perforated valve in combination with the main valve for the purpose of more gradually stopping off the water, or other liquid, thereby preventing or lessening the liability of pipes bursting from the reaction of the stream when a strong head of water is too suddenly stopped off; as is the case in the common cock or faucet.

THOMAS C. CLARKE.

Witnesses:
JOSEPH GREER,
ANNE B. GRISCOM.